(12) United States Patent
Shoji

(10) Patent No.: US 7,503,231 B2
(45) Date of Patent: Mar. 17, 2009

(54) SUPPORT OF DISPLACEMENT-DETECTION DEVICE, SENSOR SUPPORT ASSEMBLY AND DISPLACEMENT-DETECTION DEVICE

(75) Inventor: Shigeru Shoji, Tokyo (JP)

(73) Assignee: TDK Corporation, Tokyo (JP)

( * ) Notice: Subject to any disclaimer, the term of this patent is extended or adjusted under 35 U.S.C. 154(b) by 305 days.

(21) Appl. No.: 11/414,301

(22) Filed: May 1, 2006

(65) Prior Publication Data

US 2006/0254375 A1    Nov. 16, 2006

(30) Foreign Application Priority Data

May 12, 2005    (JP) ............................. 2005-139629

(51) Int. Cl.
G01D 21/00    (2006.01)
(52) U.S. Cl. .................. 73/866.5; 324/207.25
(58) Field of Classification Search .................. 267/158, 267/160, 163–165, 85, 80, 151, 102, 103, 267/107, 109
See application file for complete search history.

(56) References Cited

U.S. PATENT DOCUMENTS

| | | | |
|---|---|---|---|
| 3,581,298 A | * | 5/1971 | Billawala .................. 360/245.6 |
| 4,291,350 A | | 9/1981 | King et al. |
| 2006/0101911 A1 | | 5/2006 | Shoji |

FOREIGN PATENT DOCUMENTS

| | | |
|---|---|---|
| JP | 52-146612 | 12/1977 |
| JP | 62-51020 | 3/1987 |
| JP | 2502912 | 4/1996 |
| JP | 9-318390 | 12/1997 |
| JP | 2000-205808 | 7/2000 |

(Continued)

OTHER PUBLICATIONS

U.S. Appl. No. 11/482,796, filed Jul. 10, 2006, Shoji.

(Continued)

*Primary Examiner*—Robert R Raevis
(74) *Attorney, Agent, or Firm*—Oblon, Spivak, McClelland, Maier & Neustadt, P.C.

(57) ABSTRACT

A support of a displacement-detection device for detecting a relative displacement of a movable member with respect to a fixed member includes an attaching section to be fixed to the fixed member or the movable member, a pair of first spring arms extended from the attaching section, a first turn-back section coupled to top ends of the pair of first spring arms, a pair of second spring arms extended from the first turn-back section toward a returning direction, a second turn-back section coupled to top ends of the pair of second spring arms, a pair of third spring arms extended from the second turn-back section toward another returning direction, and a sensor-fixing section coupled to top ends of the pair of third spring arms. A displacement-detection sensor is to be fixed to the sensor-fixing section. Bending angles of the pair of first spring arms and the pair of third spring arms and a bending angle of the pair of second spring arms cancel each other out. The attaching section, the pair of first spring arms, the first turn-back section, the pair of second spring arms, the second turn-back section, the pair of third spring arms and the sensor-fixing section are formed by a unitary member.

20 Claims, 10 Drawing Sheets

FOREIGN PATENT DOCUMENTS

JP        2003-240603        8/2003

OTHER PUBLICATIONS

U.S. Appl. No. 11/453,090, filed Jun. 15, 2006, Shoji.
U.S. Appl. No. 11/483,099, filed Jul. 10, 2006, Shoji.
U.S. Appl. No. 11/414,301, filed May 1, 2006, Shoji.
U.S. Appl. No. 11/549,820, filed Oct. 16, 2006, Shoji.
U.S. Appl. No. 11/549,768, filed Oct. 16, 2006, Shoji, et al.

* cited by examiner

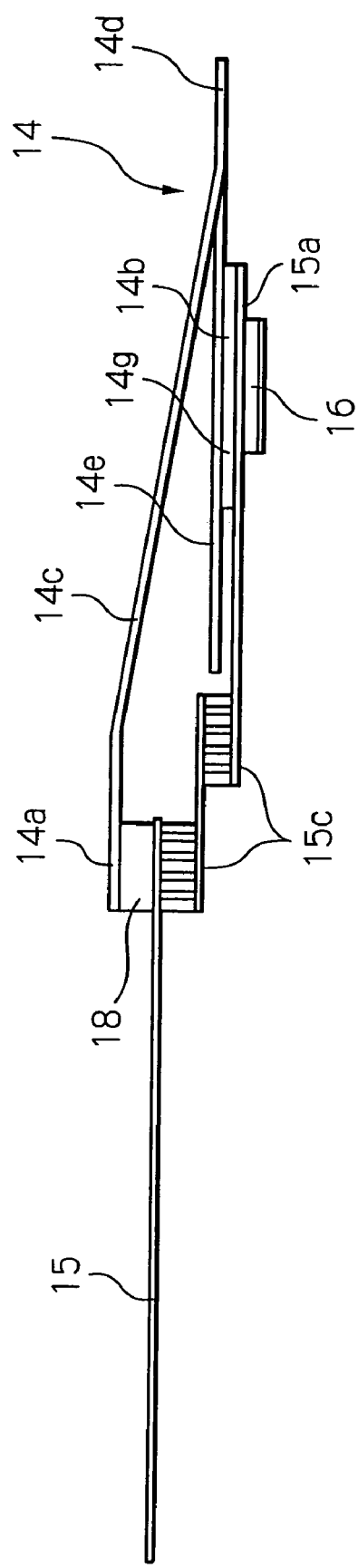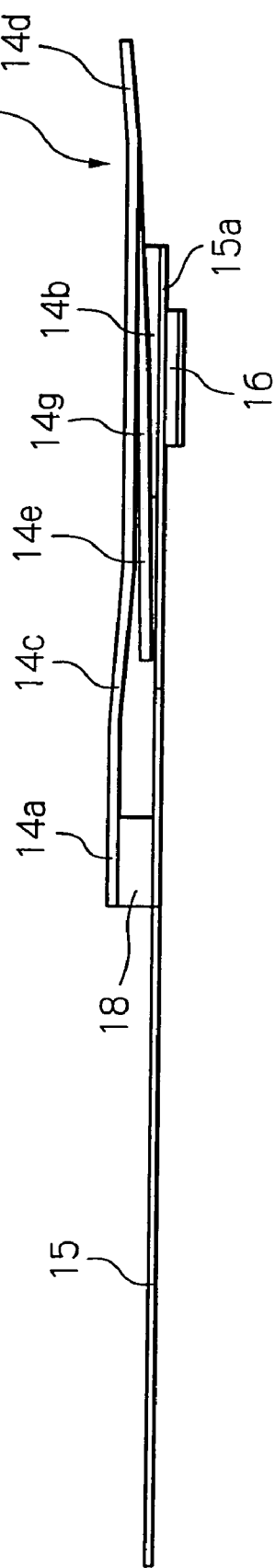

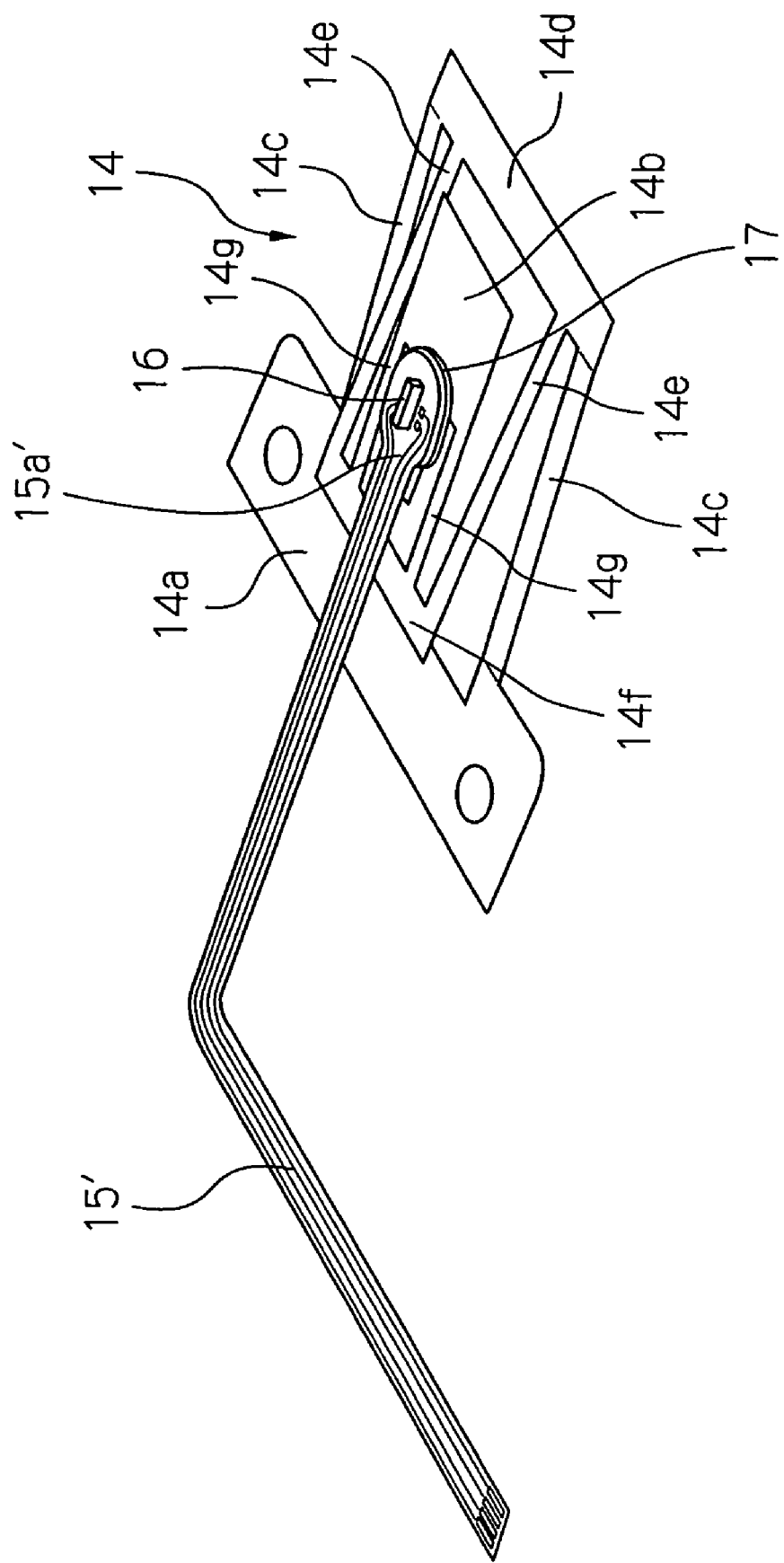

SUPPORT OF DISPLACEMENT-DETECTION DEVICE, SENSOR SUPPORT ASSEMBLY AND DISPLACEMENT-DETECTION DEVICE

PRIORITY CLAIM

This application claims priority from Japanese patent application No.2005-139629, filed on May 12, 2005, which is incorporated herein by reference.

BACKGROUND OF THE INVENTION

1. Field of the Invention

The present invention relates to a support of a displacement-detection device such as a magnetic encoder with magnetoresistive effect (MR) elements, to a sensor support assembly, and to the displacement-detection device. Particularly, the present invention relates to a support of a displacement-detection device such as a rotary encoder used for detecting a displacement of a rotary lens barrel of a camera, to a sensor support assembly, and to the displacement-detection device.

2. Description of the Related Art

Demand for high resolution and downsizing in a magnetic rotary encoder is now proceeding because of the need for more precise control of the rotation angle. The higher resolution and more downsizing in the magnetic rotary encoder, the larger influence of a gap between a magnetic medium and a magnetic sensor of the encoder occurs. Therefore, in order to provide high resolution and downsizing, it is requested to keep the gap at constant.

Because a sliding structure for sliding the magnetic sensor on the surface of the magnetic medium with keeping the sensor in contact with the magnetic medium is effective to proceeds the high resolution and downsizing, many of the recent magnetic encoders adopt such sliding structure. However, when a magnetic rotary encoder with the sliding structure has a typical flat-shaped magnetic sensor, it is quite difficult to precisely mount this flat-shaped magnetic sensor on the encoder. Thus, such magnetic sensor may sometimes incline in a direction perpendicular to the magnetized pitch of the magnetic medium, that is, the magnetic sensor may sometimes pitch with respect to the magnetic medium. In this case, a gap at the sensing portion may vary causing fluctuations or reductions in sensor output even when the magnetic sensor partly contacts to the magnetic medium.

Japanese patent publication No.2000-205808A discloses a sliding type magnetic rotary encoder with a pressure spring for applying pressure to a magnetic sensor that can be swung around the swing center axis nearly parallel to a displacement direction of a magnetic medium in order to prevent the magnetic sensor from slanting to the magnetic medium.

Japanese patent publication No.2003-240603A discloses a pressure spring for supporting a magnetic sensor. The spring has folded arms for pressing the magnetic sensor with uniform force to prevent the magnetic sensor from slanting to a magnetic medium.

Japanese patent publication No.62-051020A discloses a suspension of a head support mechanism for magnetic disk drive but not for a magnetic rotary encoder. The suspension has a two-spring structure of a lifting spring and a folded spring to sufficiently respond to the movement in a direction perpendicular to the disk surface and also to have enough stiffness in a direction parallel to the disk surface, so that a magnetic head follows up-down movement of the disk surface without tilting.

However, since the configuration disclosed in Japanese patent publication No.2000-205808A requires a load point capable of swinging, structure of this load point becomes complicated. Also, because the pressure spring is long, it is very difficult to miniaturize the configuration. Furthermore, because the structure disclosed in this publication is made to forcefully adjust the inclination of the head with respect to the magnetic medium by applying the pressure, it is required to provide considerably high pressure.

Since the pressure spring disclosed in Japanese patent publication No.2003-240603A is folded, it is possible to somewhat downsize the spring. However, because the spring is folded only one time, enough downsizing of the pressure spring cannot be expected. Also, because of the one-time folded structure of the spring, it is difficult to move up-and-down the magnetic sensor without changing its attitude. Therefore, when the position of the magnetic medium varies or variations in the attached position of the magnetic sensor occurs, a pitch angle of the magnetic sensor varies causing change in the gap between the sensing portion of the magnetic sensor and the magnetic medium to increase to an extent that cannot neglect. Particularly, if the total length of the pressure spring is shortened, the gap change in response to the variation in the pitch angle of the magnetic sensor more increases.

Since the suspension disclosed in Japanese patent publication No. 62-051020A is designed specifically for the magnetic disk drive and has the two-spring structure with the lifting spring and the folded spring, its structure itself is complicated. Also, because the folded spring used has one-time folded structure, it is quite difficult to move up-and-down the magnetic head without changing its attitude.

Furthermore, in the conventional high-resolution downsized magnetic encoder, a stress from a wiring member may be applied to a magnetic sensor inducing difficulty in the attitude control of the magnetic sensor when the suspension deforms in response to the up-and-down movement of the sensor. Particularly, when the length of the wiring member is short, the up-and-down movement of the sensor wields a very large influence over the attitude control of the magnetic sensor.

SUMMARY OF THE INVENTION

It is therefore an object of the present invention to provide a support of a displacement-detection device, a sensor support assembly and the displacement-detection device, whereby change in a gap between a sensor and an information medium due to variation in the position of the information medium and variation in the attached position of the sensor can be significantly decreased.

Another object of the present invention is to provide a sensor support assembly and the displacement-detection device, whereby an influence of a stress exerted by a wiring member can be more reduced.

According to the present invention, a support of a displacement-detection device for detecting a relative displacement of a movable member with respect to a fixed member includes an attaching section to be fixed to the fixed member or the movable member, a pair of first spring arms extended from the attaching section, a first turn-back section coupled to top ends of the pair of first spring arms, a pair of second spring arms extended from the first turn-back section toward a returning direction, a second turn-back section coupled to top ends of the pair of second spring arms, a pair of third spring arms extended from the second turn-back section toward another returning direction, and a sensor-fixing section coupled to top ends of the pair of third spring arms. A displacement-detection sensor is to be fixed to the sensor-fixing section. Bending angles of the pair of first spring arms and the pair of third spring arms and a bending angle of the pair of second spring arms cancel each other out. The attaching section, the pair of first spring arms, the first turn-back section, the pair of second spring arms, the second turn-back section, the pair of third spring arms and the sensor-fixing section are formed by a unitary member.

The attaching section and the sensor-fixing section are coupled by the pair of first spring arms, the pair of second spring arms and the pair of third spring arms, which extend toward the respective bending directions, and bending angles of the pair of first spring arms and the pair of third spring arms that extend one direction and a bending angle of the pair of second spring arms that extend the other direction cancel each other out. Therefore, even when variations in the position of the information medium and variations in the attached position of the sensor occur and thus a gap between the attaching section of the support and the information medium changes, in other words, a load applied to the sensor-fixing section varies, the sensor-fixing section of the support moves up-and-down substantially in parallel to the attaching section of the support with keeping the attitude of the sensor particularly in the pitching angle direction. Thus, the gap change at the sensing portion due to variations in the position of the information medium and variations in the attached position of the sensor can be extremely reduced. As a result, by using the support according to the present invention, it is possible to provide a displacement-detection device capable of stably operating with high resolution.

Furthermore, according to the present invention, since the attaching section and the sensor-fixing section are coupled by the pair of first spring arms, the pair of second spring arms and the pair of third spring arms, which extend toward the respective bending directions, the size of the support can be shortened. Therefore, it is possible to make the support compact and thus the displacement-detection device can be more downsized.

It is preferred that the sensor-fixing section locates near a center of the pair of first spring arms, the pair of second spring arms and the pair of third spring arms.

It is also preferred that a length of the pair of first spring arms is longer than that of the pair of second spring arms, and that a length of the pair of second spring arms is longer than that of the pair of third spring arms.

It is further preferred that the attaching section, the pair of first spring arms, the first turn-back section, the pair of second spring arms, the second turn-back section, the pair of third spring arms and the sensor-fixing section are formed by a unitary plate spring with slits.

According to the present invention, also, a sensor support assembly of a displacement-detection device for detecting a relative displacement of a movable member with respect to a fixed member includes a support, a displacement-detection sensor fixed to a sensor-fixing section of the support, and a flexible wiring member fixed to the support and provided with lead conductors electrically connected to electrode terminals of the displacement-detection sensor. The support includes an attaching section to be fixed to the fixed member or the movable member, a pair of first spring arms extended from the attaching section, a first turn-back section coupled to top ends of the pair of first spring arms, a pair of second spring arms extended from the first turn-back section toward a returning direction, a second turn-back section coupled to top ends of the pair of second spring arms, a pair of third spring arms extended from the second turn-back section toward another returning direction, and the sensor-fixing section coupled to top ends of the pair of third spring arms. Bending angles of the pair of first spring arms and the pair of third spring arms and a bending angle of the pair of second spring arms cancel each other out. The attaching section, the pair of first spring arms, the first turn-back section, the pair of second spring arms, the second turn-back section, the pair of third spring arms and the sensor-fixing section are formed by a unitary member.

The attaching section and the sensor-fixing section of the support are coupled by the pair of first spring arms, the pair of second spring arms and the pair of third spring arms, which extend toward the respective bending directions, and bending angles of the pair of first spring arms and the pair of third spring arms that extend one direction and a bending angle of the pair of second spring arms that extend the other direction cancel each other out. Therefore, even when variations in the position of the information medium and variations in the attached position of the sensor occur and thus a gap between the attaching section of the support and the information medium changes, in other words, a load applied to the sensor-fixing section varies, the sensor-fixing section of the support moves up-and-down substantially in parallel to the attaching section of the support with keeping the attitude of the sensor particularly in the pitching angle direction. Thus, the gap change at the sensing portion due to variations in the position of the information medium and variations in the attached position of the sensor can be extremely reduced. As a result, by using the assembly according to the present invention, it is possible to provide a displacement-detection device capable of stably operating with high resolution.

Furthermore, according to the present invention, since the attaching section and the sensor-fixing section of the support are coupled by the pair of first spring arms, the pair of second spring arms and the pair of third spring arms, which extend toward the respective bending directions, the size of the support can be shortened. Therefore, it is possible to make the assembly compact and thus the displacement-detection device can be more downsized.

It is preferred that the sensor-fixing section locates near a center of the pair of first spring arms, the pair of second spring arms and the pair of third spring arms.

It is also preferred that a length of the pair of first spring arms is longer than that of the pair of second spring arms, and that a length of the pair of second spring arms is longer than that of the pair of third spring arms.

It is further preferred that the attaching section, the pair of first spring arms, the first turn-back section, the pair of second spring arms, the second turn-back section, the pair of third spring arms and the sensor-fixing section are formed by a unitary plate spring with slits.

It is preferred that a top end section of the flexible wiring member is fixed to the sensor-fixing section of the support, that a middle section of the flexible wiring member is fixed to the attaching section of the support, and that the flexible wiring member has a play between the top end section and the middle section. By providing such play, it is possible to extremely reduce a stress applied from the wiring member to the sensor resulting that attitude control of the sensor for keeping its pitching angle constant can be more easily performed. In this case, preferably, the play of the flexible wiring member comprises a U-shaped play in a plane of the attaching section of the support. Also, preferably, the middle section of the flexible wiring member is fixed to the attaching section of the support through a seat for adjusting a height of the middle section.

It is preferred that a top end section of the flexible wiring member is fixed to the sensor-fixing section of the support, wherein a middle section of the flexible wiring member is fixed to the attaching section of the support, and wherein the flexible wiring member has a narrow section with a narrow width between the top end section and the middle section. By providing such narrow section, it is possible to extremely reduce a stress applied from the wiring member to the sensor resulting that attitude control of the sensor for keeping its pitching angle constant can be more easily performed. In this case, preferably, the middle section of the flexible wiring member is fixed to the attaching section of the support through a seat for adjusting a height of the middle section.

It is also preferred that a top end section of the flexible wiring member is fixed to the sensor-fixing section of the support, and that a middle section of the flexible wiring member is separated from the attaching section of the support.

It is further preferred that the displacement-detection sensor comprises a magnetic sensor with at least one MR element. In this case, preferably, the at least one MR element includes at least one giant magnetoresistive effect (GMR) element or at least one tunnel magnetoresistive effect (TMR) element.

According to the present invention, further, a displacement-detection device for detecting a relative displacement of a movable member with respect to a fixed member includes a sensor support assembly attached to the fixed member and provided with a displacement-detection sensor, and an information medium attached to the movable member with a cylindrical shape along a perimeter of the movable member. Information is recorded on the information medium with a predetermined pitch. The displacement-detection sensor of the assembly performs signal detection under a state where the displacement-detection sensor is in contact with the information medium. The assembly includes a support, the displacement-detection sensor fixed to a sensor-fixing section of the support, and a flexible wiring member fixed to the support and provided with lead conductors electrically connected to electrode terminals of the displacement-detection sensor. The support includes an attaching section to be fixed to the fixed member, a pair of first spring arms extended from the attaching section, a first turn-back section coupled to top ends of the pair of first spring arms, a pair of second spring arms extended from the first turn-back section toward a returning direction, a second turn-back section coupled to top ends of the pair of second spring arms, a pair of third spring arms extended from the second turn-back section toward a returning direction, and the sensor-fixing section coupled to top ends of the pair of third spring arms. Bending angles of the pair of first spring arms and the pair of third spring arms and a bending angle of the pair of second spring arms cancel each other out. The attaching section, the pair of first spring arms, the first turn-back section, the pair of second spring arms, the second turn-back section, the pair of third spring arms and the sensor-fixing section are formed by a unitary member.

The attaching section and the sensor-fixing section of the support are coupled by the pair of first spring arms, the pair of second spring arms and the pair of third spring arms, which extend toward the respective bending directions, and bending angles of the pair of first spring arms and the pair of third spring arms that extend one direction and a bending angle of the pair of second spring arms that extend the other direction cancel each other out. Therefore, even when variations in the position of the information medium and variations in the attached position of the sensor occur and thus a gap between the attaching section of the support and the information medium changes, in other words, a load applied to the sensor-fixing section varies, the sensor-fixing section of the support moves up-and-down substantially in parallel to the attaching section of the support With keeping the attitude of the sensor particularly in the pitching angle direction. Thus, the gap change at the sensing portion due to variations in the position of the information medium and variations in the attached position of the sensor can be extremely reduced. As a result, by using the assembly according to the present invention, it is possible to provide a displacement-detection device capable of stably operating with high resolution.

Furthermore, according to the present invention, since the attaching section and the sensor-fixing section of the support are coupled by the pair of first spring arms, the pair of second spring arms and the pair of third spring arms, which extend toward the respective bending directions, the size of the support can be shortened. Therefore, it is possible to make the assembly compact and thus the displacement-detection device can be more downsized.

It is preferred that the sensor-fixing section of the support locates near a center of the pair of first spring arms, the pair of second spring arms and the pair of third spring arms.

It is also preferred that a length of the pair of first spring arms is longer than that of the pair of second spring arms, and that a length of the pair of second spring arms is longer than that of the pair of third spring arms.

It is further preferred that the attaching section, the pair of first spring arms, the first turn-back section, the pair of second spring arms, the second turn-back section, the pair of third spring arms and the sensor-fixing section of the support are formed by a unitary plate spring with slits.

It is preferred that a top end section of the flexible wiring member is fixed to the sensor-fixing section of the support, that a middle section of the flexible wiring member is fixed to the attaching section of the support, and that the flexible wiring member has a play between the top end section and the middle section. In this case, preferably, the play of the flexible wiring member includes a U-shape play in a plane of the attaching section of the support. In this case, also preferably, the middle section of the flexible wiring member is fixed to the attaching section of the support through a seat for adjusting a height of the middle section.

It is also preferred that a top end section of the flexible wiring member is fixed to the sensor-fixing section of the support, that a middle section of the flexible wiring member is fixed to the attaching section of the support, and that the flexible wiring member has a narrow section with a narrow width between the top end section and the middle section. In this case, preferably, the middle section of the flexible wiring member is fixed to the attaching section of the support through a seat for adjusting a height of the middle section.

It is further preferred that a top end section of the flexible wiring member is fixed to the sensor-fixing section of the support, and that a middle section of the flexible wiring member is separated from the attaching section of the support.

It is preferred that the displacement-detection sensor comprises a magnetic sensor with at least one MR element. Preferably, the at least one MR element includes at least one GMR element or at least one TMR element.

It is also preferred that the fixed member is a fixed barrel, and that the movable member is a rotational barrel rotatable about the same axis as the fixed barrel. In this case, the rotational barrel and the fixed barrel may be a rotational lens barrel and a fixed lens barrel of a camera, respectively.

Further objects and advantages of the present invention will be apparent from the following description of the preferred embodiments of the invention as illustrated in the accompanying drawings.

BRIEF DESCRIPTION OF THE DRAWINGS

FIGS. 7a and 7b show side views illustrating operations of a FPC member shown in FIG. 2;

FIG. 9 shows an oblique view schematically illustrating a configuration of a sensor-suspension assembly in another embodiment according to the present invention.

DESCRIPTION OF THE PREFERRED EMBODIMENTS

Figure 1:
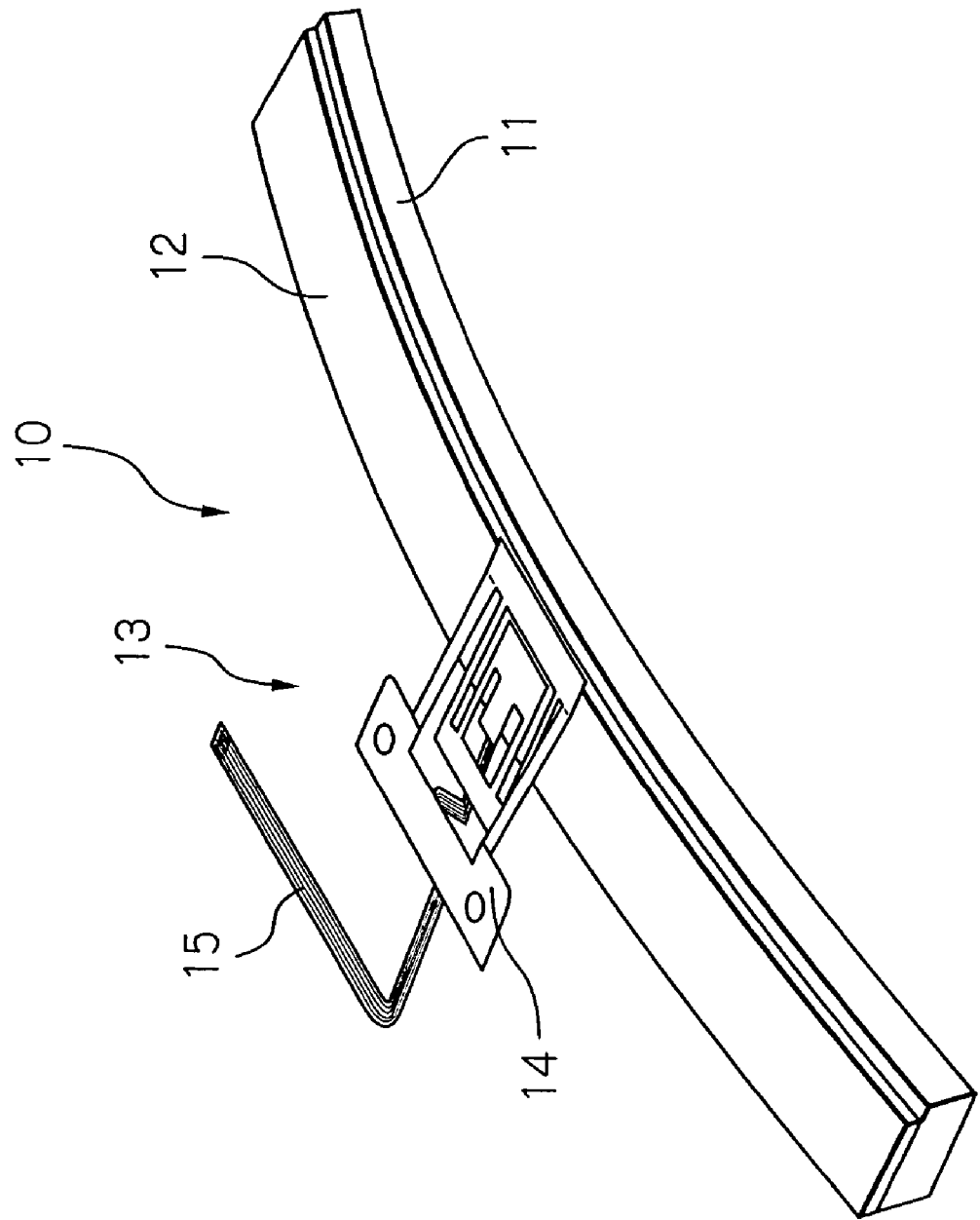
FIG. 1 shows an oblique view schematically illustrating a configuration of a magnetic rotary encoder as a preferred embodiment according to the present invention.
Figure 2:
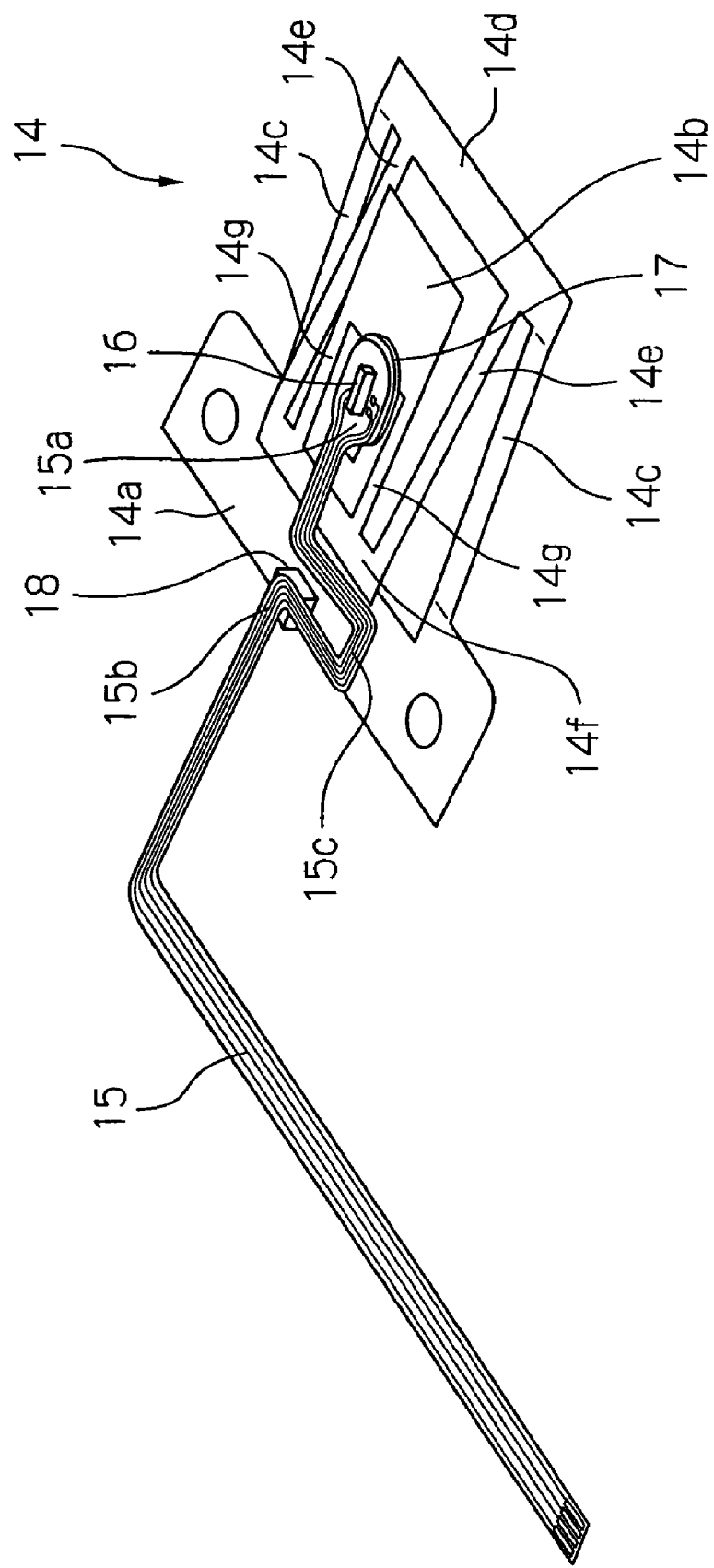
FIG. 2 shows an oblique view schematically illustrating a configuration of a sensor-suspension assembly in the magnetic rotary encoder shown in FIG. 1.
Figure 3:
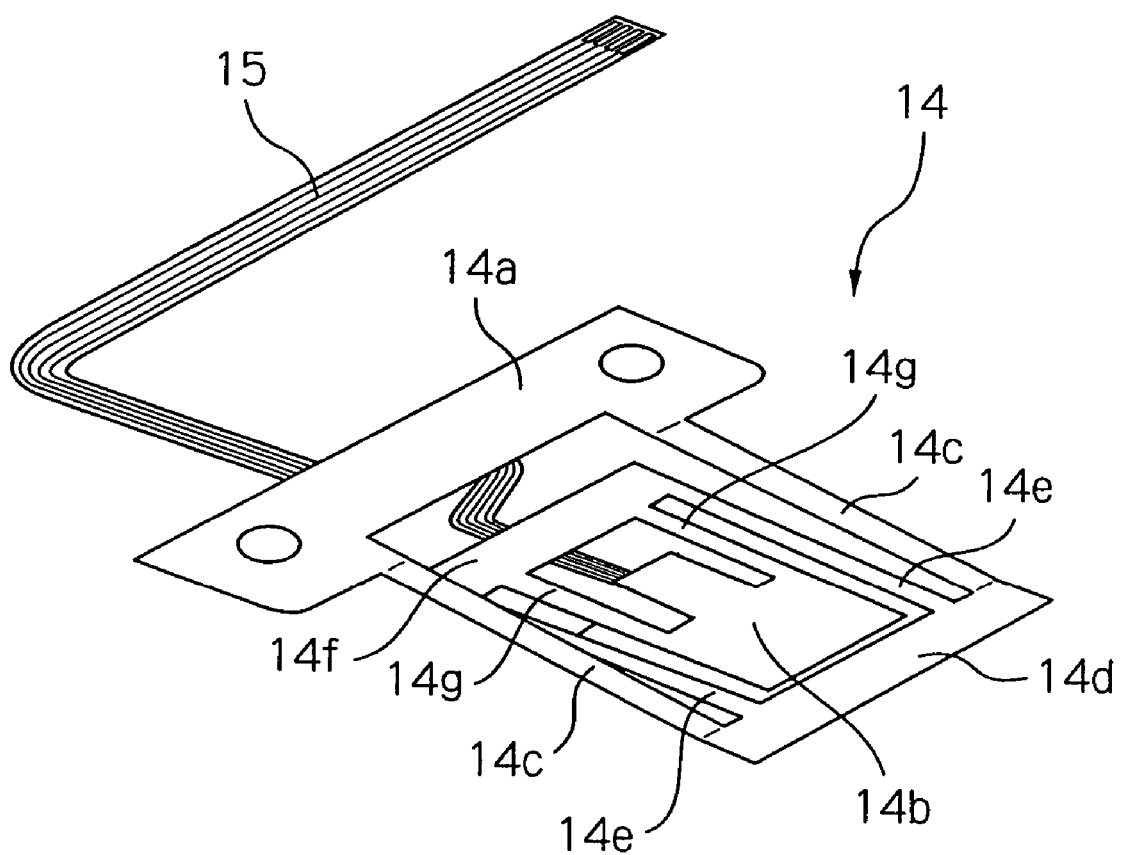
FIG. 3 shows an oblique view illustrating the sensor-suspension assembly shown in FIG. 2, seen from a direction opposite to FIG. 2.

FIG. 1 schematically illustrates a configuration of a magnetic rotary encoder as a preferred embodiment according to the present invention, FIG. 2 schematically illustrates a configuration of a sensor-suspension assembly in the magnetic rotary encoder shown in FIG. 1, and FIG. 3 illustrates the sensor-suspension assembly shown in FIG. 2, seen from a direction opposite to FIG. 2.

As shown in these drawings, a magnetic rotary encoder 10 in this embodiment, which corresponds to the displacement-detection device according to the present invention, is mainly constituted by a tape-shaped magnetic medium 12, which corresponds to an information medium according to the present invention, fixed by an adhesive for example to a part of the perimeter of a rotational barrel 11 of a camera, and a sensor suspension assembly 13, which corresponds to the sensor support assembly according to the present invention, fixed to a fixed barrel (not shown) of the camera by means of grommets for example.

The magnetic medium 12 is formed by coating a magnetic layer on a tape-shaped resin film, and by recording magnetic information with a predetermined magnetized pitch on the magnetic layer.

The sensor suspension assembly 13 is attached to the fixed barrel so that a sliding surface of a magnetic sensor chip comes into contact with and slides over the magnetic medium 12.

As illustrated in detail in FIGS. 2 and 3, the sensor suspension assembly 13 is provided with a suspension 14, which corresponds to the support according to the present invention, a flexible print circuit (FPC) member 15 with lead conductors, which corresponds to the flexible wiring member according to the present invention, and a magnetic sensor chip 16. The suspension 14 is formed from a unitary metal plate spring member with slits such as for example a stainless steel plate with slits. The top end section 15a of the FPC member 15 is fixed to a sensor-fixing section 14b located at the center of the suspension 14, and the middle section 15b of the FPC member 15 is fixed to an attaching section 14a of the suspension 14. The magnetic sensor chip 16 is fixed by an adhesive for example to a surface of the FPC member 15 at the position of the sensor-fixing section 14b of the suspension 14.

The suspension 14 has a pair of first spring arms 14c extended from the attaching section 14a, a first turn-back section 14d coupled to the top ends of the first spring arms 14c, a pair of second spring arms 14e extended from the first turn-back section 14d toward the folded-back or returning direction, a second turn-back section 14f coupled to the top ends of the second spring arms 14e, a pair of third spring arms 14g extended from the second turn-back section 14f toward the folded-back or returning direction, and the sensor-fixing section 14b coupled to the top ends of the third spring arms 14g.

The first spring arms 14c and the third spring arms 14g extend toward the same direction whereas the second spring arms 14e extend toward the direction opposite to this same direction. A length of the first spring arms 14c is longer than that of the second spring arms 14e, and a length of the second spring arms 14e is longer than that of the third spring arms 14g. A width and a thickness of each pair of these spring arms are determined so that bending angles or angle changes due to bending of the first spring arms 14c and the third spring arms 14g and a bending angle or an angle change due to bending of the second spring arms 14e cancel each other out.

Figure 4:
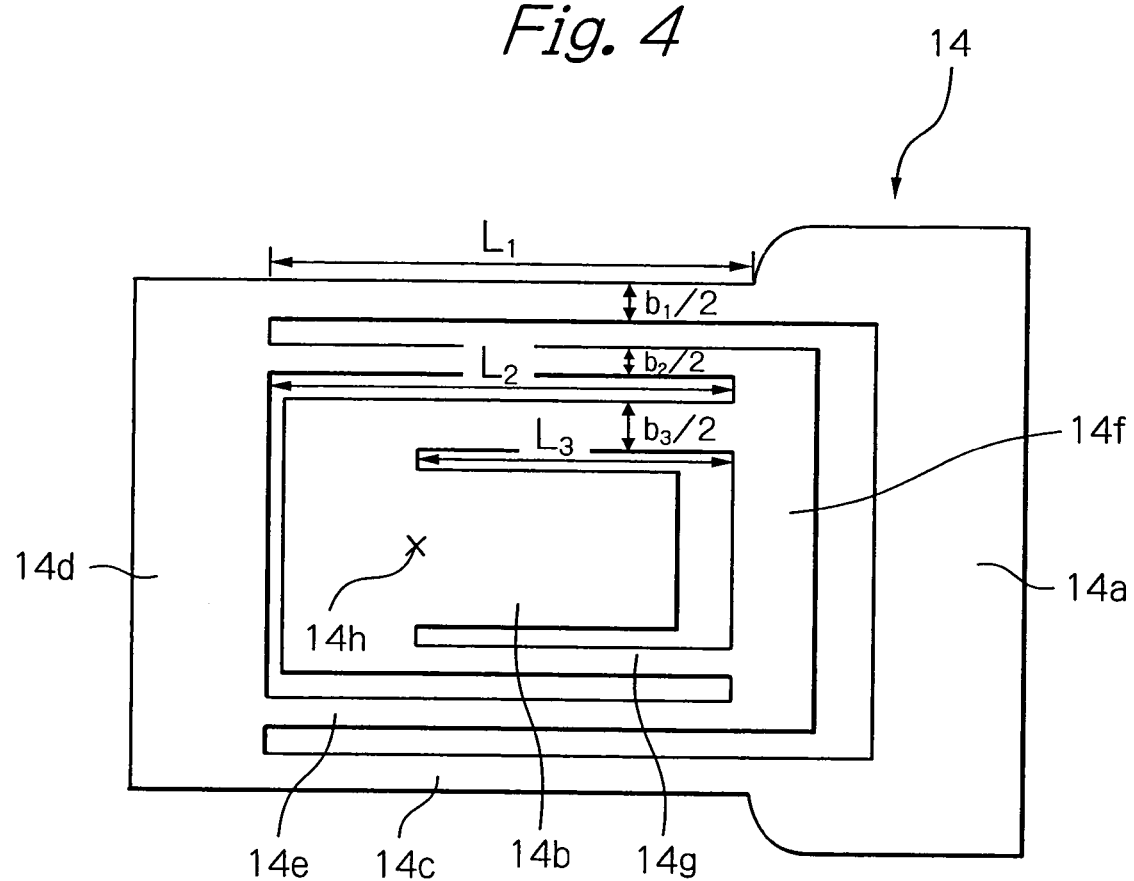
FIG. 4 shows a view illustrating an example of concrete dimensions of a suspension shown in FIG. 2.

FIG. 4 illustrates an example of concrete dimensions of the suspension 14.

As shown in the figure, suppose that $L_1$ indicates a length of the first spring arms 14c, $b_1/2$ indicates a width of the first spring arms 14c, $L_2$ indicates a length of the second spring arms 14e, $b_2/2$ indicates a width of the second spring arms 14e, $L_3$ indicates a length of the third spring arms 14g, and $b_3/2$ indicates a width of the third spring arms 14g, and that thicknesses of these spring arms are the same each other and indicated as h.

Bending amounts $\delta_1$, $\delta_2$ and $\delta_3$ of the first, second and third spring arms 14c, 14e and 14g and also angle changes or pitching angle changes $\theta_1$, $\theta_2$ and $\theta_3$ of the first, second and third spring arms 14c, 14e and 14g when $L_1$=7.7 mm, $L_2$=7.5 mm, $L_3$=5.0 mm, $b_1$=1.6 mm, $b_2$=1.2 mm, $b_3$=2.4 mm, and h=0.07 mm, and a load of P=5.0 grams is applied to a load point 14h of the sensor-fixing section 14b from underneath or the backside of FIG. 4 are calculated as follows:

$$\delta_1 = PL_1^3/3EI_1 = 4P/b_1E \cdot (L_1/h)^3 = 0.8756579 \text{ mm},$$

$$\delta_2 = PL_2^3/3EI_2 = 4P/b_2E \cdot (L_2/h)^3 = 1.078909 \text{ mm},$$

$$\delta_3 = PL_3^3/3EI_3 = 4P/b_3E \cdot (L_3/h)^3 = 0.1598384 \text{ mm},$$

$$\theta_1 = PL_1^2/2EI_1 = 9.7736774 \text{ degrees},$$

$$\theta_2 = PL_2^2/2EI_2 = 12.363397 \text{ degrees},$$

$$\theta_3 = PL_3^2/2EI_3 = 2.7474215 \text{ degrees},$$

where each spring arm is made of a stainless steel with a Young's modulus E=19000 kg/mm², and section secondary moments $I_1$, $I_2$ and $I_3$ of the first, second and third spring arms 14c, 14e and 14g are represented as $I_1=b_1h^3/12$, $I_2=b_2h^3/12$ and $I_3=b_3h^3/12$.

The angle changes or the pitching angle changes $\theta_1$, $\theta_2$ and $\theta_3$ of the first, second and third spring arms 14c, 14e and 14g due to their bending are canceled each other out, and therefore the final angle change or the final pitching angle change becomes $\theta=\theta_1+\theta_3-\theta_2=0.16$ degrees.

Figure 5A:
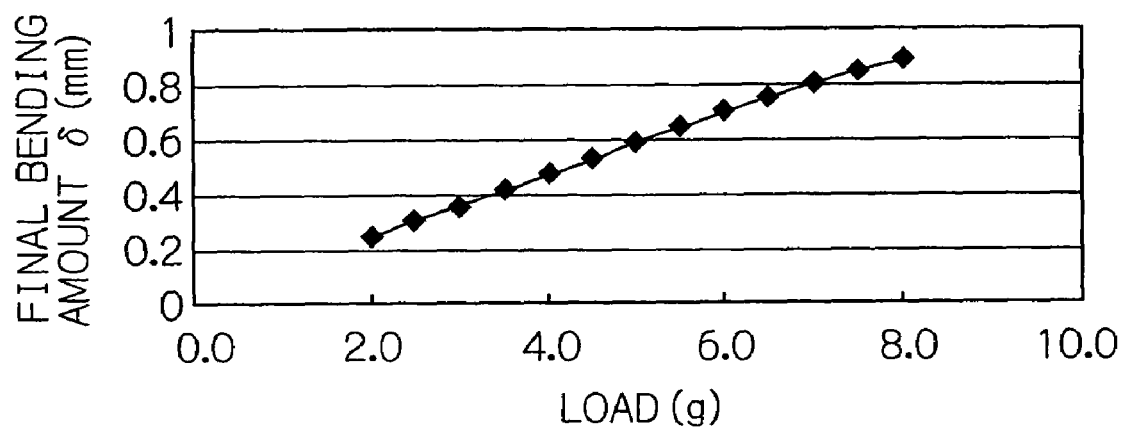
FIGS. 5a and 5b show graphs illustrating a relationship between a final bending amount δ and a load and a relationship between a final change in angle θ and a load.
Figure 5B:
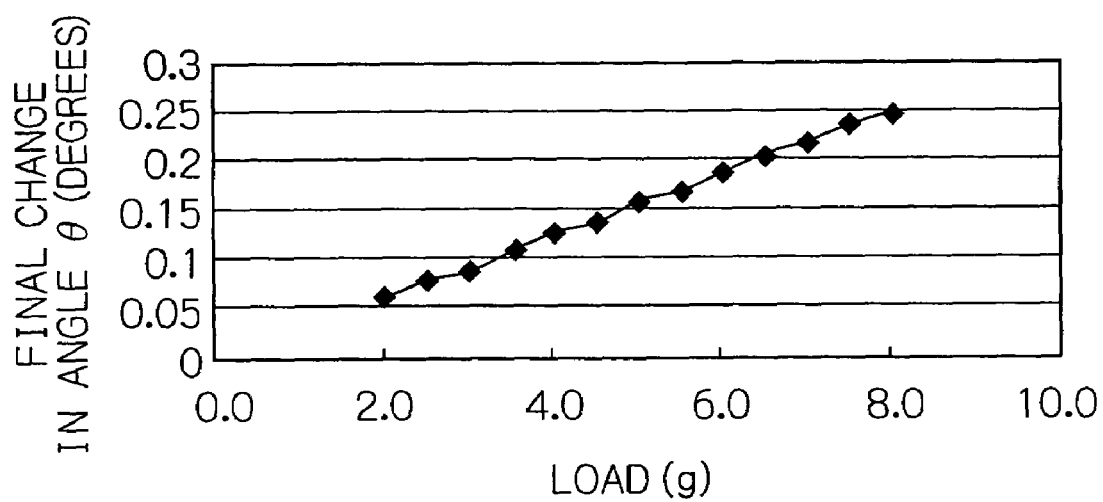

FIGS. 5a and 5b illustrate a relationship between the final bending amount δ and the load applied and a relationship between the final angle change θ and the load applied. According to this embodiment, as shown in these figures, the final angle change θ is extremely small as up to 0.25 degrees even when the load applied changes in a range of 2.0-8.0 grams.

In general, change in the load applied to the load point 14h induces variations in the position of the magnetic medium 12 and variations in the attached position of the magnetic sensor 16, causing a gap between the attaching section 14a of the suspension 14 and the magnetic medium 12 to change. However, according to this embodiment, the pitching angle change is restricted to a quite small value and the sensor-fixing section 14b of the suspension 14 moves up-and-down substantially in parallel to the attaching section 14a of the suspension 14 with keeping the attitude of the magnetic sensor chip 16 particularly in the pitching angle direction. Thus, according to this embodiment, the gap change at the sensing portion due to variations in the position of the magnetic medium 12 and variations in the attached position of the magnetic sensor 16 can be extremely reduced to provide a magnetic rotary encoder capable of stably operating with high resolution. Because the magnetic sensor chip 16 in the magnetic rotary encoder according to this embodiment, which relatively moves along the magnetic medium 12 fixed around the perimeter of the cylinder, has a very small width in a direction of the perimeter of the cylinder, change in the gap at the sensing portion due to inclination of the magnetic sensor chip 16 itself toward the magnetized direction of the magnetic medium 12 or rolling of the magnetic sensor chip 16 is quite small and its influence is negligible.

Furthermore, according to this embodiment, since a plate spring member of the suspension 14 is configured from the first, second and third spring arms 14c, 14e and 14g extending toward bending sections extended along the plate spring member of the suspension, the size of the plate spring can be shortened. Therefore, it is possible to make the suspension 14 compact and thus the magnetic rotary encoder can be more downsized.

Figure 6A:
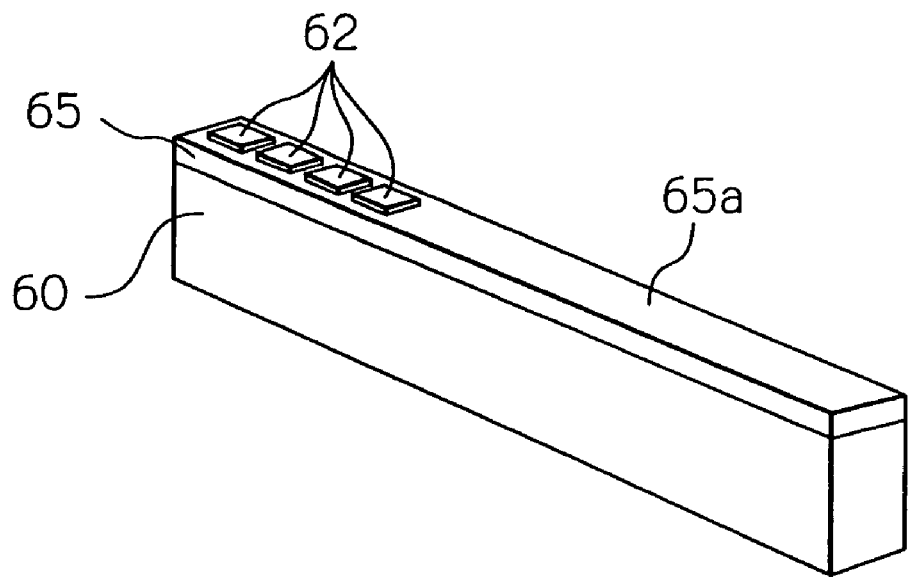
FIGS. 6a and 6b show an oblique view and an exploded oblique view illustrating a structure of a magnetic sensor chip shown in FIG. 2.
Figure 6B:
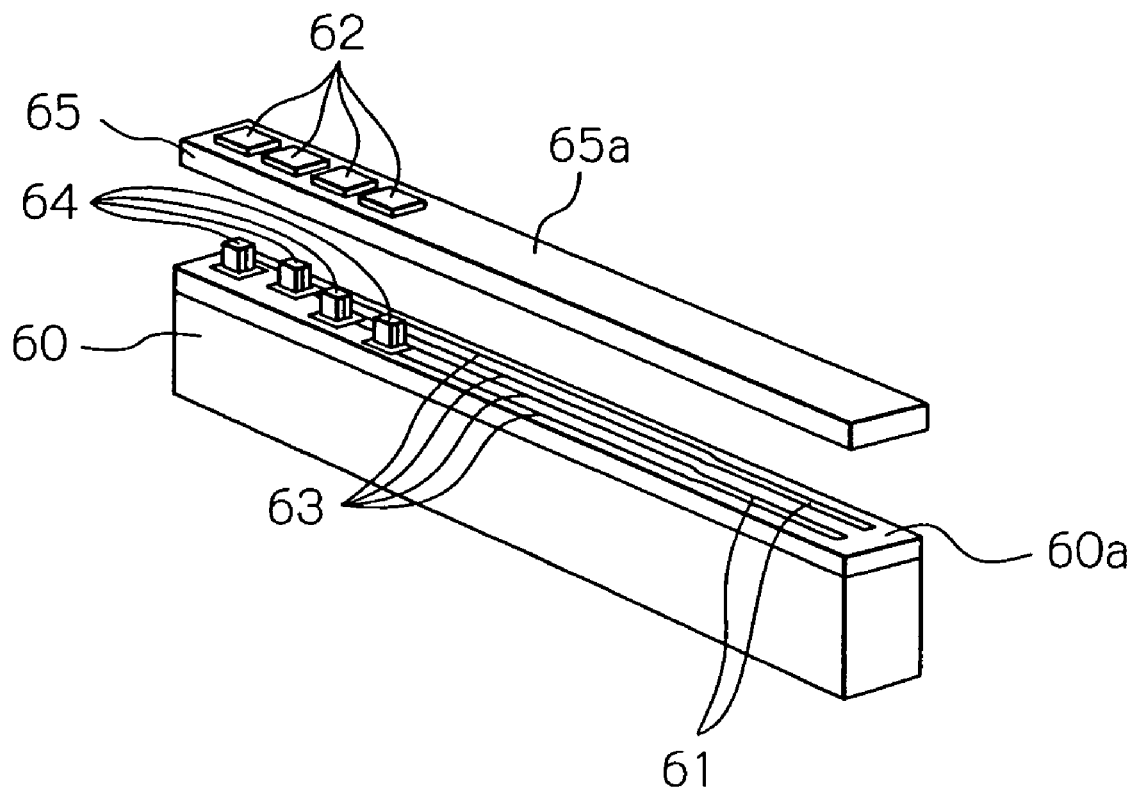

FIGS. 6a and 6b illustrate in detail the structure of the magnetic sensor chip shown in FIG. 2.

As shown in these figures, the magnetic sensor chip 16 in this embodiment mainly consists of a substrate 60 of a slender rectangular parallelepiped shape, a plurality of, in this case two, GMR elements or TMR elements 61 formed on a surface 60a of the substrate 60, electrode terminals 62 of the GMR elements or TMR elements 61, lead conductors 63 and via hole conductors 64 formed on the surface 60a for electrically connecting the GMR elements or TMR elements 61 with the electrode terminals 62, and an insulation coating film or protection film 65. The surface 60a of the substrate 60, the GMR elements or TMR elements 61 and the lead conductors 64 are coated with the insulation coating film 65, and the via hole conductors 64 penetrate through the insulation coating film 65. A surface 65a of the insulation coating film 65 operates as a sliding surface that comes in contact with the magnetic medium 12 (FIG. 1). The electrode terminals 62 are formed on this surface of the insulation coating film 65.

The insulation coating film 65 may be a single layer film but preferably a multilayered film. More preferably, the insulation coating film 65 has a two-layered structure of an alumina ($Al_2O_3$) layer (substrate side) and a diamond like carbon (DLC) layer. The most preferably, the insulation coating film 65 has a three-layered structure of an $Al_2O_3$ layer (substrate side), a silicon (Si) layer and a DLC layer. Such multilayered structure reduces the friction resistance and thus reduces a wearing down of the insulation coating film.

The two GMR elements or TMR elements 61 are arranged at a predetermined interval in parallel to each other along a direction that is the same as the relative movement direction of the sensor suspension assembly 13 with respect to the magnetic medium 12, namely a magnetized pitch direction of the magnetic medium 12. Each of the GMR elements or TMR elements 61 is U-shaped by folding a linear strip to obtain a high-power and high-sensitivity element.

The substrate 60 is made of for example AlTiC ($Al_2O_3$—TiC). The electrode terminals 62, the lead conductors 63 and the via hole conductors 64 are made of a conductive material such as for example copper (Cu). Each of the GMR elements or TMR elements 61 is formed as a typical multilayered GMR element or TMR element.

As shown in detail in FIG. 2, the FPC member 15 in this embodiment is a flexible wiring member formed by patterning connection conductors and connection pads on a resin film, and by coating a portion of the connection conductors with a resin layer. The top end section 15a of the FPC member 15 is fixed by an adhesive to the sensor-fixing section 14b of the suspension 14 through a seat 17, the middle section 15b of the FPC member 15 is fixed by an adhesive to the attaching section 14a of the suspension 14 through a seat 18, and the remaining section of the FPC member 15 is free, not fixed to the suspension 14. Particularly, in this embodiment, the FPC member 15 has a play 15c between the top end section 15a and the middle section 15b. This play 15c is a side-play in parallel with a plane of the suspension 14 and has a rough U-shape. By providing such play 15c, the middle section 15b of the FPC member 15 can be fixed to the suspension 14 resulting the sensor suspension assembly 13 to make compact.

The connection pads formed at a top end section of the FPC member 15 and the electrode terminals formed on the magnetic sensor chip 16 are electrically connected to each other by wire bonding.

FIGS. 7a and 7b illustrate operations of the FPC member 15. FIG. 7a indicates a state where a gap distance between the attaching section 14a of the suspension 14 and the magnetic medium 12 is long, and FIG. 7b indicates a state where the gap distance between the attaching section 14a of the suspension 14 and the magnetic medium 12 is short, that is a large load is applied to the magnetic sensor chip 16 and this sensor chip is pressed in.

As shown in FIG. 7b, the FPC member 15 becomes substantially flat when the magnetic sensor chip 16 is pressed in. In order to attain this flat state of the FPC member 15, the seat 18 for adjusting a height of the FPC member is inserted between the middle section 15b of this FPC member 15 and the attaching section 14a of the suspension 14, and also the seat 17 (FIG. 2) is inserted between the top end section 15a of this FPC member 15 and the sensor-fixing section 14b of the suspension 14. Under this flat state, the FPC member 15 produces the minimum force to exert no influence upon attitude control of the suspension 14. In modifications, the seat 17 may be omitted.

In case that the gap distance between the attaching section 14a of the suspension 14 and the magnetic medium 12 increases due to variations in the position of the magnetic medium 12 and variations in the attached position of the magnetic sensor 16, the attaching section 14a and the sensor-fixing section 14b move in parallel with each other by the operations of the suspension 14 to increase the space between the attaching section 14a and the sensor-fixing section 14b. However, in this case, as shown in FIG. 7a, because the U-shaped play 15c of the FPC member 15 absorbs the stress by its free movement of twist bending, the stress applied to the suspension 14 from the FPC member 15 is quite small. Thus, no influence upon the attitude control of the suspension 14 occurs. As a result, it is possible to move up-and-down the magnetic sensor chip 16 without changing its attitude and with keeping the attitude of the magnetic sensor chip 16 with respect to the magnetic medium 12 in parallel.

If the FPC member is laminated on the suspension 14 along the respective spring arms, it is possible to further reduce the stress applied to the suspension from the FPC member. However, since the FPC member is expensive, the manufacturing cost of the sensor suspension assembly will extremely increase in case that the FPC member is formed along the spring arms for a long distance.

Figures 8A, 8B, 8C:
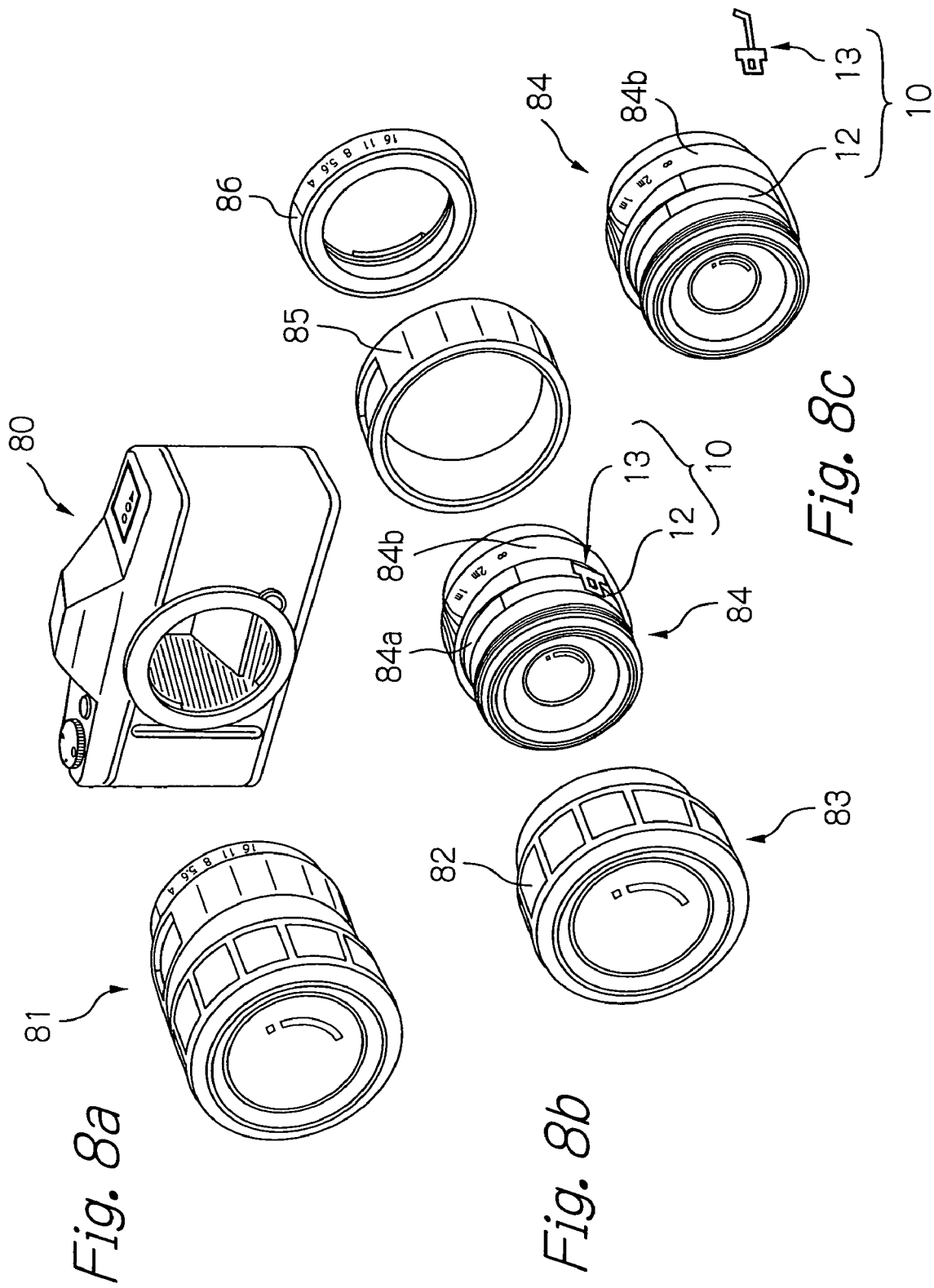
FIGS. 8a to 8c show exploded oblique views schematically illustrating configurations of a single-lens reflex camera with the magnetic rotary encoder of the embodiment of FIG. 1.

FIGS. 8a to 8c schematically illustrate configurations of a single-lens reflex camera with the magnetic rotary encoder of this embodiment.

In FIG. 8a, reference numeral 80 denotes a main body of the camera and 81 denotes a lens barrel, respectively. The lens barrel 81 is provided with as shown in FIG. 8b a focusing ring 82, a front lens barrel 83 with a group of focusing lenses, a rear lens barrel 84 with a group of zoom lenses, a zoom ring 85, and a mount ring 86. As shown in FIGS. 8b and 8c, the aforementioned magnetic rotary encoder 10 is attached to the rear lens barrel 84.

As mentioned before, the magnetic rotary encoder 10 is configured by the tape-shaped magnetic medium 12 fixed by an adhesion for example to a part of the perimeter of the rotational barrel 84a of the rear lens barrel 84, and the sensor suspension assembly 13 fixed to the fixed barrel 84b of the rear lens barrel 84 by means of grommets for example.

FIG. 9 schematically illustrates a configuration of a sensor-suspension assembly in another embodiment according to the present invention.

In this embodiment, only a structure of a FPC member 15' is different from that of the FPC member 15 and other structure is the same as that in the embodiment of FIG. 1. Therefore, in FIG. 9, the same elements as in FIG. 2 use the same reference numerals.

The FPC member 15' in the embodiment is a flexible wiring member formed by patterning connection conductors and connection pads on a resin film, and by coating a portion of the connection conductors with a resin layer. The top end section 15a' of the FPC member 15' is fixed by an adhesive to the sensor-fixing section 14b of the suspension 14 through a seat 17, and the remaining section of the FPC member 15' is free, not fixed to the suspension 14. Also, the FPC member 15' in the embodiment has no play as in the embodiment of FIG. 1.

The connection pads formed at a top end section of the FPC member 15' and the electrode terminals formed on the magnetic sensor chip 16 are electrically connected to each other by wire bonding.

Because the FPC member 15' in this embodiment needs to have a long length in order to reduce a force applied to the suspension 14 from this FPC member 15', it is difficult to make compact the sensor suspension assembly 13. However, as there is no play, the structure of the FPC member 15' itself becomes simple.

Other structure, operations and advantages of this embodiment are the same as these of the embodiment of FIG. 1.

Figure 10:
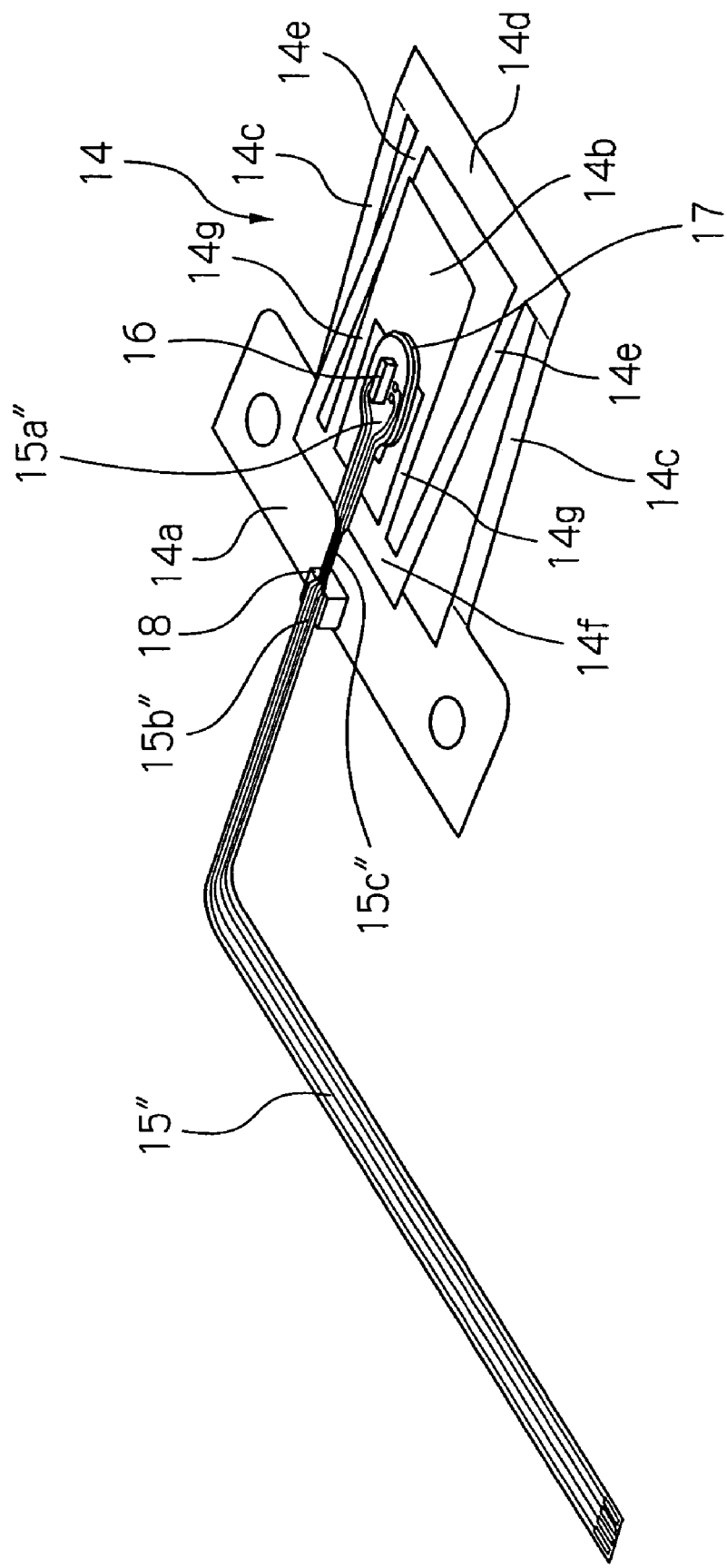
FIG. 10 shows an oblique view schematically illustrating a configuration of a sensor-suspension assembly in further embodiment according to the present invention.

FIG. 10 schematically illustrates a configuration of a sensor-suspension assembly in further embodiment according to the present invention.

In this embodiment, only a structure of a FPC member 15" is different from that of the FPC member 15 and other structure is the same as that in the embodiment of FIG. 1. Therefore, in FIG. 10, the same elements as in FIG. 2 use the same reference numerals.

The FPC member 15" in the embodiment is a flexible wiring member formed by patterning connection conductors and connection pads on a resin film, and by coating a portion of the connection conductors with a resin layer. The top end section 15a" of the FPC member 15" is fixed by an adhesive to the sensor-fixing section 14b of the suspension 14 through a seat 17, the middle section 15b" of the FPC member 15" is fixed by an adhesive to the attaching section 14a of the suspension 14 through a seat 18, and the remaining section of the FPC member 15" is free, not fixed to the suspension 14. Particularly, in this embodiment, the FPC member 15" has a narrow section 15c" with a narrow width in a part between the top end section 15a" and the middle section 15b". This narrow section 15c" reduces a restriction force exerted by the FPC member 15" when the suspension 14 deforms. By providing such narrow section 15c", the middle section 15b" of the FPC member 15" can be fixed to the suspension 14 resulting the sensor suspension assembly 13 to make compact.

The connection pads formed at a top end section of the FPC member 15" and the electrode terminals formed on the magnetic sensor chip 16 are electrically connected to each other by wire bonding.

Other structure, operations and advantages of this embodiment are the same as these of the embodiment of FIG. 1.

In the aforementioned embodiments, the magnetic medium is attached around the rotational barrel and the sensor suspension assembly is attached to the fixed barrel. However, in modifications, the sensor suspension assembly is attached to the rotational barrel and the magnetic medium is attached around the fixed barrel. Also, in modifications, an optical sensor or other various sensors may be used instead of the magnetic sensor. Applications of the sensor suspension assembly are not limited to a camera but various applications may be considered. Furthermore, although in the aforementioned embodiments, the magnetic medium is used as information medium, any kinds of medium other than the magnetic medium that records reference position information may be used.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A sensor support assembly of a displacement-detection device for detecting a relative displacement of a movable member with respect to a fixed member, said assembly including a support, a displacement-detection sensor fixed to a sensor-fixing section of said support, and a flexible wiring member fixed to said support and provided with lead conductors electrically connected to electrode terminals of said displacement-detection sensor, said displacement-detection sensor performing signal detection under a state where said displacement-detection sensor is in contact with an information medium attached to said movable member or said fixed member along a perimeter thereof, information being recorded on said information medium with a predetermined pitch, said support comprising an attaching section to be fixed to said fixed member or said movable member, a pair of first spring arms extended from said attaching section, a first turn-back section coupled to top ends of said pair of first spring arms, a pair of second spring arms extended from said first turn-back section toward a returning direction, a second turn-back section coupled to top ends of said pair of second spring arms, a pair of third spring arms extended from said second turn-back section toward another returning direction, and said sensor-fixing section coupled to top ends of said pair of third spring arms, bending angles of said pair of first spring arms and said pair of third spring arms and a bending angle of said pair of second spring arms canceling each other out, said attaching section, said pair of first spring arms, said first turn-back section, said pair of second spring arms, said second turn-back section, said pair of third spring arms and said sensor-fixing section being formed by a unitary member.

2. The assembly as claimed in claim 1, wherein said sensor-fixing section of said support locates near a center of said pair of first spring arms, said pair of second spring arms and said pair of third spring arms.

3. The assembly as claimed in claim 1, wherein a length of said pair of first spring arms is longer than that of said pair of second spring arms, and wherein a length of said pair of second spring arms is longer than that of said pair of third spring arms.

4. The assembly as claimed in claim 1, wherein said unitary member is formed by a unitary plate spring with slits.

5. The assembly as claimed in claim 1, wherein a top end section of said flexible wiring member is fixed to said sensor-fixing section of said support, wherein a middle section of said flexible wiring member is fixed to said attaching section of said support, and wherein said flexible wiring member has a play between said top end section and said middle section.

6. The assembly as claimed in claim 5, wherein said play of said flexible wiring member comprises a U-shaped play in a plane of said attaching section of said support.

7. The assembly as claimed in claim 5, wherein said middle section of said flexible wiring member is fixed to said attaching section of said support through a seat for adjusting a height of said middle section.

8. The assembly as claimed in claim 1, wherein a top end section of said flexible wiring member is fixed to said sensor-fixing section of said support, wherein a middle section of said flexible wiring member is fixed to said attaching section of said support, and wherein said flexible wiring member has a narrow section with a narrow width between said top end section and said middle section.

9. The assembly as claimed in claim 8, wherein said middle section of said flexible wiring member is fixed to said attaching section of said support through a seat for adjusting a height of said middle section.

10. The assembly as claimed in claim 1, wherein a top end section of said flexible wiring member is fixed to said sensor-fixing section of said support, and wherein a middle section of said flexible wiring member is separated from said attaching section of said support.

11. The assembly as claimed in claim 1, wherein said displacement-detection sensor comprises a magnetic sensor with at least one magnetoresistive effect element.

12. The assembly as claimed in claim 11, wherein said at least one magnetoresistive effect element comprises at least one giant magnetoresistive effect element or at least one tunnel magnetoresistive effect element.

13. A displacement-detection device for detecting a relative displacement of a movable member with respect to a fixed member, said device including a sensor support assembly attached to said fixed member and provided with a displacement-detection sensor, and an information medium attached to said movable member with a cylindrical shape along a perimeter of the movable member, information being recorded on said information medium with a predetermined pitch, said displacement-detection sensor of said assembly performing signal detection under a state where said displacement-detection sensor is in contact with said information medium, said assembly including a support, said displacement-detection sensor fixed to a sensor-fixing section of said support, and a flexible wiring member fixed to said support and provided with lead conductors electrically connected to electrode terminals of said displacement-detection sensor, said support comprising an attaching section to be fixed to said fixed member, a pair of first spring arms extended from said attaching section, a first turn-back section coupled to top ends of said pair of first spring arms, a pair of second spring arms extended from said first turn-back section toward a returning direction, a second turn-back section coupled to top ends of said pair of second spring arms, a pair of third spring arms extended from said second turn- back section toward another returning direction, and said sensor-fixing section coupled to top ends of said pair of third spring arms, bending angles of said pair of first spring arms and said pair of third spring arms and a bending angle of said pair of second spring arms canceling each other out, said attaching section, said pair of first spring arms, said first turn-back section, said pair of second spring arms, said second turn-back section, said pair of third spring arms and said sensor-fixing section being formed by a unitary member.

14. The device as claimed in claim 13, wherein a top end section of said flexible wiring member is fixed to said sensor-fixing section of said support, wherein a middle section of said flexible wiring member is fixed to said attaching section of said support, and wherein said flexible wiring member has a play between said top end section and said middle section.

15. The device as claimed in claim 14, wherein said play of said flexible wiring member comprises a U-shape play in a plane of said attaching section of said support.

16. The device as claimed in claim 14, wherein said middle section of said flexible wiring member is fixed to said attaching section of said support through a seat for adjusting a height of said middle section.

17. The device as claimed in claim 13, wherein a top end section of said flexible wiring member is fixed to said sensor-fixing section of said support, wherein a middle section of said flexible wiring member is fixed to said attaching section of said support, and wherein said flexible wiring member has a narrow section with a narrow width between said top end section and said middle section.

18. The device as claimed in claim 13, wherein a top end section of said flexible wiring member is fixed to said sensor-fixing section of said support, and wherein a middle section of said flexible wiring member is separated from said attaching section of said support.

19. The device as claimed in claim 13, wherein said fixed member is a fixed barrel, and wherein said movable member is a rotational barrel rotatable about the same axis as said fixed barrel.

20. The device as claimed in claim 19, wherein said rotational barrel and said fixed barrel are a rotational lens barrel and a fixed lens barrel of a camera, respectively.

* * * * *